Patented Mar. 1, 1938

2,109,645

UNITED STATES PATENT OFFICE 2,109,645

QUALITATIVE CHEMICAL IDENTIFICATION AND CONTROL ANALYSIS

Herman P. Lankelma, Cleveland, Ohio, assignor to The Standard Oil Company, Cleveland, Ohio, a corporation of Ohio No Drawing. Application December 30, 1933, Serial No. 704,766

1 Claim. (Cl. 87—9)

This invention relates to qualitative chemical identification and control, and it is among the objects of the invention to provide a procedure and composition capable of simple and rapid detection or determination of chemical products, particularly liquid hydrocarbons. Other objects and advantages will appear as the description proceeds.

To the accomplishment of the foregoing and related ends, the invention, then, comprises the features hereinafter fully described, and particularly pointed out in the claim, the following description setting forth in detail certain illustrative embodiments of the invention, these being indicative however of but a few of the various ways in which the principle of the invention may be employed.

To the primary material, such as for instance a liquid hydrocarbon, there is thoroughly incorporated a soluble characterizing agent. The liquid hydrocarbon may be of lighter or heavier gravity as most important in any given circumstance, such as hydrocarbons of the range of naphthas, burning oils, or lubricating oils. The characterizing agent has in general the property of being detectable in the mixture with the liquid hydrocarbon, even though a high degree of dilution may have been accomplished. As examples of such agent, I may refer to furfural, phenol, and like agents qualitatively detectable in the mixture, irrespective of extreme dilution. For instance, furfural is added to the liquid hydrocarbon such as the naphtha, and is thoroughly agitated and incorporated therewith, in an amount of about one part by weight to 20,000 parts of the naphtha. The mixture is capable of storage and handling without separation or change, and at any subsequent time is readily determinable, taking for instance 10 cc. of the mixture, adding about 1 cc. of glacial acetic acid, then about 5 cc. of aniline, and shaking, then further adding 1 cc. of water and shaking, whereupon a pink to red color develops in the lower or aqueous layer.

Similarly, for instance also, phenol is dissolved in the liquid hydrocarbon, for example, lubricating oil, in very dilute ratio, such as one part by weight to 2500 parts of the oil, and is thoroughly agitated and incorporated. Subsequently, the mixture is treated as follows: Reagent A is prepared, containing approximately 1.5 gr. of para-nitro aniline in a mixture of one pint of water and 40 cc. of concentrated hydrochloric acid. Reagent B is prepared of approximately 6 per cent aqueous solution of sodium nitrite; reagent C of approximately 25 per cent aqueous solution of sodium acetate; and reagent D of approximately 10 per cent aqueous solution of sodium hydroxide. To about 4 cc. of reagent A, there is added reagent B drop-wise until reagent A is decolorized, this requiring about 1 to 3 drops, whereupon about 6 cc. of the oil mixture to be detected is added. Then about 4 cc. of reagent C is added, with vigorous shaking for about a minute. Then about 6 cc. of reagent D is added, and again the mixture is shaken vigorously. A yellow to reddish color develops in the lower or aqueous layer.

By such means, liquid hydrocarbon mixtures may be easily and quickly identified irrespective of sophistications by dilution or admixture, and irrespective of subjection to various temperature or storage or handling conditions.

Other modes of applying the principle of the invention may be employed, change being made as regards the details described, provided the features stated in the following claim, or the equivalent of such, be employed.

I therefore particularly point out and distinctly claim as my invention:—

A process of the character described, which comprises treating a liquid hydrocarbon with a small amount of phenol, subsequently taking a sample of such hydrocarbon, and reacting upon the contained phenol with para-nitro aniline, hydrochloric acid, sodium nitrite, sodium acetate and aqueous sodium hydroxide solution.

HERMAN P. LANKELMA.